United States Patent

[11] 3,552,493

[72] Inventor Cornelis Bezemer
  Rijswijk, Netherlands
[21] Appl. No. 788,107
[22] Filed Dec. 30, 1968
[45] Patented Jan. 5, 1971
[73] Assignee Shell Oil Company
  New York, N.Y.
  a corporation of Delaware
[32] Priority Mar. 18, 1968
[33] Great Britain
[31] 12,778/68

[54] METHOD FOR TREATING A PART OF A PERMEABLE FORMATION
11 Claims, No Drawings

[52] U.S. Cl. .................................................. 166/295
[51] Int. Cl. .................................................. E21b 33/138
[50] Field of Search ...................................... 166/295, 294, 300

[56] References Cited
UNITED STATES PATENTS

| | | | |
|---|---|---|---|
| 3,291,213 | 12/1966 | Bezemer et al. | 166/295 |
| 3,294,166 | 12/1966 | Havenaar et al. | 166/295 |
| 3,294,168 | 12/1966 | Bezemer et al. | 166/295 |
| 3,297,089 | 1/1967 | Spain | 166/295 |
| 3,310,111 | 3/1967 | Pavlich et al. | 166/295 |
| 3,316,966 | 5/1967 | Dear, Jr. | 166/295 |
| 3,339,633 | 9/1967 | Richardson | 166/295 |
| 3,368,625 | 2/1968 | Wittenwyler | 166/295 |

*Primary Examiner*—Stephen J. Novosad
*Attorneys*—George G. Pritzker and J. H. McCarthy ABSTRACT: A method of consolidating permeable unconsolidated formations with an epoxy forming resin under controlled reaction and temperature conditions using three premixed solutions which are to be supplied to the field, one solution comprising epoxide dissolved in aromatic hydrocarbons, the second solution comprising a curing agent dissolved in aromatic and nonaromatic hydrocarbons and the third solution containing phenol and m.p. cresol dissolved in aromatic and nonaromatic hydrocarbons. By suitably choosing the amount of the third solution, the mixture of the three solutions can be used in a temperature range of from 20° C. to 100° C. A part of a permeable formation surrounding a well is treated with a resin-forming composition which on hardening at the formation temperature forms a film consisting of a hardened resin covering the surfaces of the sand grains of the formation.

METHOD FOR TREATING A PART OF A PERMEABLE FORMATION

BACKGROUND OF THE INVENTION

As the original permeability of the formation part treated by the present method is substantially retained, since the hardened resin forms only a film on the wall of the pore space of the formation, this method is particularly suitable for providing a bond between the grains of an unconsolidated or only partly consolidated permeable subsurface formation to prevent the grains from being entrained by fluid passing into or out of the formation via the well. In particular, when a well communicating with such an unconsolidated or only partly consolidated formation is used as a production well for producing gas, water or oil from the formation, considerable damage can be done to the production equipment by those grains which are carried upwardly by the fluid flow to the well head. The coarser grains of the formation, which are not carried upwardly, accumulate in the producing section of the well and thus reduce its production rate. If the production rate becomes too low, the well has to be cleaned out before a new production cycle can begin. In some cases the grains (such as sand grains) enter the well in such great quantities that it is not possible to produce the well economically.

It will be clear that, when consolidating formation parts surrounding production wells, an appreciable permeability to oil, gas or water should be left in the treated parts of the formation as otherwise it will become very difficult, if not impossible, to recover these products from the subsurface formation. This also applies to formation parts surrounding injection wells which are used to inject a fluid into the subsurface formation either to dispose of such fluid, or to use it as a drive fluid to drive valuable products contained in the pore space of the formation in the direction of production wells.

The present invention relates in particular to a method for treating underground formation parts, in which a clear solution of a resin forming composition comprising an epoxy compound and a suitable curing agent for this compound is injected down a well into the pore space of a part of the formation surrounding this well. This solution after having been prepared by mixing in a solvent, an epoxy compound, a curing agent and any other component if considered useful for the purpose, remains clear for some time, although the reaction between the resin forming components dissolved therein starts immediately after the mixing operation begins. The intermediate reaction product which is being formed by this reaction remains soluble in the solvent as long as the molecular weight of this product does not exceed a certain value.

During the progress of the reaction, however, the molecular weight of the intermediate reaction product increases, and passes the value at which this product is no longer soluble in the solvent. Subsequently those molecules of the intermediate reaction product, of which the molecular weight has passed this value, will separate from the solution as a separate liquid phase, thereby turning the solution turbid.

The time interval between the moment of preparation (mixing) of the solution and the moment at which the first droplets of intermediate reaction product separate from the solution is indicated in the present specification and claims by the expression "clear solution period." This time interval is followed by a time interval in which the separation of the intermediate reaction product and the spreading thereof over the surface of the grains of the formation to be consolidated takes place, which interval is indicated by the term "phase separation period." Subsequent to this latter period, which ends at the moment of complete separation of the intermediate reaction product from the solvent, the intermediate reaction product transforms into a hard, cross-linked resin which bonds the sand grains firmly together.

It will be appreciated that the consolidation mixture will have to be within the pore space of the formation part to be treated before the beginning of the phase separation period, since otherwise the intermediate reaction product would filter off on the surface of the formation part to be treated, thereby decreasing the speed at which the solution can be injected into the formation. In extreme cases, premature separation of this intermediate reaction product may even completely plug the entrances to the formation pore space thereby preventing any treatment of the formation.

For a given consolidation mixture, the length of the clear solution period (as defined above) is a function of the temperature to which the mixture is subjected. An increase in temperature will increase the rate of the reaction between the components dissolved in the solution, and consequently decrease the length of the clear solution period.

For a given temperature, the length of the clear solution period (as defined above) is a function of the rate of the reaction between the resin-forming components (and consequently of the nature of these components) and of the solubility of the intermediate product formed by this reaction in the solvent (and consequently of the nature of the intermediate reaction product as well as of the nature of this solvent).

It will be appreciated that no two wells can be consolidated under the same conditions. Formation temperatures, formation depths, and formation permeabilities vary widely in the various cases, and thus when it is considered desirable to use the same resin-forming components and solvents for consolidation purposes in various formations, measures should be taken to make the duration of the clear solution period widely variable within as large a temperature range.

OBJECTS OF THE INVENTION

One of the objects of the invention is a method for treating subsurface formations by means of a consolidating fluid which can easily be adapted to various conditions which are met in the formation to be treated.

A further object of the invention is a method for formation treatment which in a very simple manner will allow control of the length of the clear solution period of a consolidating fluid in a wide temperature range.

Still a further object of the invention is a control technique which can be used to keep the duration of the clear solution period of a formation consolidation method using a resin-forming composition within desired limits when operating in a wide range of formation temperatures, this range extending from 20° to 100° C. and covering the temperatures occurring in most of the oil formations and water formations from which oil and water are to be produced respectively via wells penetrating said formation.

Still another object of the present invention is a formation treating method in which only three premixed solutions carrying a constant concentration of components are required to compose mixtures in a dissolved state, which mixtures are suitable to treat formations at various depths, having temperatures lying within a very wide range, and having permeabilities which differ widely.

SUMMARY OF THE INVENTION

According to the invention, a method of treating part of a permeable formation surrounding a well comprises the following steps:
  a. first injecting into the formation part to be treated a fluid suitable to displace water and/or hydrocarbons, e.g., oil, therefrom;
  b. thereafter injecting into the formation a mixture obtained by mixing three solutions, said solutions being:
    1. a first solution of an epoxy compound in a solvent substantially consisting of aromatic hydrocarbons;
    2. a second solution of a curing agent suitable for curing the epoxy compound, in a solvent comprising aromatic and nonaromatic hydrocarbons; and,
    3. a third solution of phenol, meta-cresol and para-cresol in a solvent comprising aromatic and nonaromatic hydrocarbons, wherein the first and second solution are present in the mixture in such quantities that a mixture of only these two solutions would contain a total amount of epoxy compound and curing agent which is between 12 and 24 vol. percent of the total volume of the mixture of these two solutions; and, c. retaining the mixture of the three solutions in the formation part to be treated until a hard, cross-linked resin has been formed.

The fluid suitable to displace water from the formation may also be suitable to displace oil. This displacement fluid may comprise an alcohol, such as methanol, ethanol, isopropyl alcohol or a liquid mixture comprising at least one of these liquids.

The curing agent as dissolved in the second solution may be a polyamine containing at least three amino-hydrogen atoms.

The quantities and compositions of the first and the second solution present in the mixture may be such that a mixture of only these two solutions should comprise between 9 and 18 vol. percent epoxy compound, between 3 and 6 vol. percent curing agent, between 25 and 35 vol. percent nonaromatic hydrocarbons and between 50 and 60 vol. percent aromatic hydrocarbons.

One liter of the third solution may comprise between 150 and 200 grams phenol, between 125 and 175 milliliters of a mixture consisting of meta- and para-cresol, between 450 and 550 milliliters kerosene and between 170 and 210 milliliters xylene.

The three solutions and the various components thereof which may be used in carrying out the method according to the invention will now be discussed in detail.

First Solution

This solution comprises an epoxy compound in a solvent substantially consisting of aromatic hydrocarbons.

The expression "epoxy compound" as used in the present specification and claims means monomeric and/or polymeric organic polyepoxides having more than one epoxy group

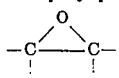 per molecule, and capable of being cured to hardened epoxy resin. An example hereof is the substance known under the Trade Marks "EPIKOTE" 828 and "EPON" 828. The number of epoxy groups contained in the average molecule is obtained by dividing the average molecular weight of the polyepoxide by the epoxide equivalent weight. The polyepoxides may be saturated or unsaturated, aliphatic, cycloaliphatic, aromatic or heterocyclic and may be substituted if desired with noninterfering substituents, such as halogen atoms, hydroxyl groups, ether radicals, and the like. They may also be monomeric or polymeric.

Preferred polyepoxides are glycidyl ethers of polyhydric phenols such as diphenylol alkanes, e.g., diphenylol propane, diphenylol ethane and diphenylol methane, diphenylol sulfone, hydroquinone, resorcinol, dihydroxydiphenyl, dihydroxynaphthalenes, and polyvalent phenols such as novolacs, and resols, which have been prepared by condensation of phenol and formaldehyde.

Glycidyl ethers of polyhydric phenols can be prepared in various ways, for example, by reaction of the polyhydric phenol with epichlorohydrin in the presence of a base, such as sodium hydroxide or potassium hydroxide. Important polyepoxides are the glycidyl ethers of 2,2-bis(4-hydroxyphenyl) propane. The molecular weight, and also the softening point and viscosity, generally depend on the ratio of epichlorohydrin to 2,2-bis(4-hydroxyphenyl)propane. If a large excess of epichlorohydrin is used, e.g., 10 molecules of epichlorohydrin per molecule of 2,2-bis(4-hydroxyphenyl)propane, the main component in the reaction product is a glycidylether of low molecular weight. The polyethers may in some cases contain small amounts of material with a terminal glycidyl radical in hydrated form. Most preferred are glycidyl polyethers of 2,2-bis(4-hydroxyphenyl)propane having a molecular weight between 340 and 4000.

Other suitable polyepoxides are poly(epoxy alkyl)ethers of aliphatic polyhydroxy compounds such as ethylene glycol, glycerol and trimethylolpropane; poly(epoxy alkyl)esters of polycarboxylic acids, such as the diglycidyl esters of phthalic acid, terephthalic acid and adipic acid, and polyglycidyl esters of polymer unsaturated fatty acids, for example, diglycidyl ester of dimerized linoleic acid; epoxidized esters of unsaturated acids, such as epoxidized linseed oil or soyabean oil; epoxidized dienes such as diepoxybutane and epoxidized vinylcyclohexane; di(epoxyalkyl)ethers in which two epoxy alkyl groups are connected by only one oxygen atom, such as diglycidyl ether; and polyepoxy compounds obtained by epoxidation of clcohexene derivatives, such as the (3,4-epoxy-6-methylcyclohexyl)methyl ester of 3,4-epoxy-6-methyl-cyclohexane carboxylic acid.

The solvent of the first solution is substantially formed by aromatic hydrocarbons. As examples of these hydrocarbons there are mentioned toluene, xylene, "Shellsol" N (Trade Mark), and "Shellsol" RA (Trade Mark). The solvent may incorporate a small amount of nonaromatic hydrocarbons. More than 10 vol. percent, however, is not considered attractive, since this reduces the solubility of the epoxy compound.

Second Solution

This solution comprises a curing agent suitable for curing the epoxy compound present in the first solution. The solvent of the second solution is suitable for dissolving the curing agent and substantially consists of a mixture of aromatic and nonaromatic hydrocarbons, such as xylene mixed with kerosene. As examples of other aromatic hydrocarbons which may be used in this mixture there are mentioned toluene, benzene, "Shellsol" N (Trade Mark), and "Shellsol" RA (Trade Mark). As other examples of nonaromatic hydrocarbons which may be used in this mixture there are mentioned gasoline and diesel oil.

The method is not restricted to any particular curing agent. It is preferred, however, to use as curing agent a polyamine compound possessing at least three amino-hydrogen atoms, such as compounds possessing at least three $-\underset{\underset{H}{|}}{\overset{H}{\overset{|}{N}}}-$ grpi-s. pr pme $-\underset{\underset{H}{|}}{\overset{H}{\overset{|}{N}}}-$ group and one $-\underset{\underset{H}{|}}{\overset{}{N}}-$ group.

Alternatively, the curing agent may be replaced by a curing agent and an adduct of an epoxy compound, this adduct being formed by a reaction between a curing agent and an epoxy compound, in which the quantity of epoxy compound is only a fraction of the maximum quantity of the epoxy compound which can react with the curing agent.

As examples of polyamine compounds which are suitable for curing epoxy compounds there are mentioned:

1-cyclohexylamino-3-aminopropane
bis(3-methyl-4-amino-cyclohexyl)methane
bis(4-aminocyclohexyl)methane
N-amino-ethylpiperazine
hexylenediamine
propylenediamine
and mixtures comprising at least one of the above compounds First Solution and Second Solution It will be appreciated that by mixing the first and the second solution, a reaction will start between the epoxy compound and the curing agent. This mixing is carried out preferably shortly before injection of the consolidating mixture into the well to pass it into the formation to be treated. As will be explained hereinafter, measures are taken to prevent a premature separation of the intermediate reaction product from the solution, since this product would filter off on the surface of the formation part to be treated, thereby decreasing the speed at which the solution can be injected into the formation.

The preparation of solutions on the spot, that is near the well penetrating the formation to be treated, is often a cumbersome procedure. For this reason, the three solutions are prepared in a factory and are transported either in drums or in bulk to the field where they are to be applied.

The total volume of the first and second solution to be injected into a formation is substantially equal to the volume of the pore space of the formation part to be treated. The concentrations of the resin-forming components (that are the epoxy compound and the curing agent) in this total volume are determined by tests in order to ascertain which concentration of the resin-forming components in the solution gives the desired compressive strength to a mass of loose particles after having consolidated these particles at an acceptable permeability reduction of this mass. Having thus ascertained the amounts of epoxy compound and curing agent which are to be dissolved in the total volume of solvent to be injected into the pore space of the formation part to be treated, this total volume is divided into two parts, the epoxy compound being dissolved in one of these parts to form the first solution and the curing agent being dissolved in the other part to form the second solution. For sake of simplicity these parts may be of equal volume, through it is not necessary. Any ratio of the volumes of these parts which differs from unity may also be used.

The first and second solution when mixed together thus comprise epoxy compound, curing agent and solvent. The total amount of epoxy compound and curing agent in the solution is between 12 and 24 vol. percent of the total volume of the first and second solution. The lower limit of this range is dictated by the minimum required compressive strength of the consolidated mass. When applying a too low concentration of the resin-forming components, the film produced on the loose grains of the mass to be consolidated will be thin, and not completely bond the grains together. Increasing the percentage of the resin forming components will yield an increasing compressive strength of the consolidated mass. However, increasing thickness of the resin film spread over the surface of the grains will decrease the volume of the free pore space between the grains, thereby impairing the permeability of this pore space. Too great a permeability reduction, however, is not allowed since fluids have to pass through the consolidated mass when flowing from the formation into the well and vice versa. The upper limit of 24 vol. percent is thus dictated by the requirement of sufficient permeability of the formation part treated by the present method.

The components of the resin-forming composition may form between 9 and 18 vol. percent of the solution as for the epoxy compound, and between 3 and 6 vol. percent of the solution as for the curing agent. A consolidation fluid suitable for the majority of formations may be formed by a solution comprising 11.4 vol. percent epoxy compound and 4.6 vol. percent curing agent.

The length of the clear solution period (i.e., the period in which the molecular weight of the intermediate reaction product is still so low that the product is still soluble in the solvent) depends on the rate of the reaction between the resin-forming components, and on the nature of the solvent used. The reaction rate of the resin-forming components depends on the ambient temperature, and increases with increasing temperature. Consequently, the clear solution period will be the shorter, the higher the temperature is.

The influence of the nature of the solvent on the duration of the clear solution period is governed by the ability of the solvent to dissolve the intermediate reaction product. Thus, when applying a solvent in which the solubility of the intermediate reaction product is relatively high (such as hydrocarbons in which the ratio between aromatics and nonaromatics is relatively high) replacement of at least part of this solvent by a second solvent in which the solubility of the intermediate reaction product is relatively low (such as hydrocarbons in which the ratio between aromatics and nonaromatics is relatively low) will result in a shortening of the clear solution period.

The control of the length of the clear solution period of the resin-forming components is of importance in view of the fact that the temperatures in the wells penetrating into formations to be treated differ widely, and that the injection of the consolidation fluid into the formation part to be treated requires a time interval which is not constant for the various wells. Since at a certain stage of the reaction the intermediate resinous product having plugging properties starts to separate out of the clear solution, the separation thereof has to be prevented in the time interval that the solution carrying the resin-forming components is still in the well, as otherwise this intermediate reaction product will be deposited on the entrances to the formation pore space and hamper the injection of the consolidation solution into the formation part to be treated.

Third Solution

To obtain a wide variation in the length of the clear solution period, suitable amounts of agents for controlling the reaction rate of the resin-forming composition are added. These agents are carried by the third solution, and by controlling the amount of the third solution when mixing this solution with the first solution (carrying the epoxy compound) and the second solution (carrying the curing agent), and by a suitable choice of the solvent of the third solution, the clear solution period can, at a given formation temperature, be chosen such that the separation of the intermediate resinous product occurs not until after the total volume of the mixture has entered the formation.

This third solution comprises three reaction promotors dissolved in aromatic hydrocarbons, these promotors being suitable to increase the rate of reaction between the epoxy compound and the curing agent (or adduct), which results in a decrease in the length of the clear solution period. The three promotors are phenol, meta-cresol and para-cresol. Further the solvent of the third solution which is suitable for dissolving the three reaction promotors comprises nonaromatic hydrocarbons for decreasing the solubility of the intermediate reaction product in the consolidation fluid, thus further decreasing the length of the clear solution period.

The advantage of using meta-cresol and para-cresol which are only half as effective as phenol for increasing the reaction rate, lies in the fact that the solubility of the combination of phenol, meta-cresol and para-cresol in aromatic hydrocarbons is appreciably greater than the solubility of phenol alone in aromatic hydrocarbons. Thus, the minimum volume of aromatic hydrocarbons required to dissolve an amount of the three promotors sufficient to obtain a certain reaction rate when added to the resin-forming components is smaller than the minimum volume of aromatic hydrocarbons required to dissolve the amount of phenol required to obtain a reaction rate of equal value. The higher solubility of the mixture of the three reaction promotors in aromatic hydrocarbons as compared to the solubility therein of phenol alone, opens the possibility the add nonaromatic hydrocarbons to the third solution to decrease the ratio of the aromatic hydrocarbons and the nonaromatic hydrocarbons in the consolidation fluid, thereby decreasing the solubility of the intermediate reaction product therein and consequently shortening the duration of the clear solution period. Thus, the addition of nonaromatic hydrocarbons has the same effect as the addition of the reaction rate promotors. It will then be evident that for a given volume of the third solution, the use of phenol, meta- and para-cresol dissolved in a mixture of aromatic and nonaromatic hydrocarbons will given an enormous decrease in the length of the clear solution period as compared to the use of phenol dissolved in aromatic hydrocarbons.

As examples of aromatic hydrocarbons to be applied in the third solution there may be mentioned toluene, benzene, xylene and mixtures comprising at least one of these hydrocarbons.

As examples of nonaromatic hydrocarbons to be applied in the third solution there may be mentioned kerosene, gasoline, diesel oil and mixtures comprising at least one of these components.

One liter of a suitable solution which may be applied as the third solution in the present method for treating the majority of unconsolidated formations may comprise between 150 and 200 grams phenol, between 125 and 175 milliliters of a mixture consisting of meta- and para-cresol, between 450 and 550 milliliters kerosene and between 170 and 210 milliliters xylene.

First, Second and Third Solution

The mixing of the three solutions may take place in any manner suitable for the purpose. The solutions may be added simultaneously to a common mixer, or may be mixed stepwise by first mixing two of the three solutions, and later on adding the remaining solution.

The amount of the third solution which forms part of the consolidation mixture to be injected into a formation part surrounding a well, is dictated by the temperature of the formation part to be treated and the time interval required to pump the whole barch of the consolidation fluid into the formation pore space after it has been prepared. High temperature formations will under equal conditions as for the time interval available for injection, require smaller amounts of the third solution than low temperature formations.

Water Displacing Fluid; Oil Displacing Fluid

Care has to be taken to remove undesirable fluids (water and/or oil) from the pore space of the part of the formation to be treated before the consolidation mixture enters this space.

Best results are obtained by preinjecting into the formation a displacing fluid with which the undesirable fluid(s) present in the formation part to be treated is (are) miscible. Alternatively, the displacement of the oil and/or water may take place by a displacing fluid which emulsifies the fluid to be displaced.

Preferably a spacer-fluid is injected after the displacing fluid but before the injection of the consolidation mixture. This spacer-fluid has to be soluble in the consolidation mixture. Further, the displacing fluid should be soluble in the spacer-fluid since the displacing fluid containing the displaced fluid is thereby effectively driven out from the part of the formation to be treated by the consolidation-fluid. In general it may be said that each injected fluid should preferably be soluble in the following fluid, so as to ensure that ultimately only the solution comprising resin, curing agent and reaction promotors is present in the part of the mass to be treated.

If the displacing fluid is a water-removing fluid, this fluid may contain a surfactant, which is preferably a compound having the formula $R-NH-(CH_2)_3-NH_2$, wherein R is an alkyl group derived from coconut oil, soya oil or tallow. As water-removing fluids, use may also be made of organic liquids, such as hydrocarbon-oxygen compounds having less than 6 carbon atoms and containing at least one keto-oxygen group such as a ketone, in particular acetone, and/or a hydroxyl group such as an alcohol, e.g., methanol, ethanol or isopropyl alcohol.

Considerations similar to those discussed above apply when the pore space of the formation part to be treated is partly or completely filled with oil. If desired a spacer-fluid may be arranged between the oil displacing fluid and the consolidation fluid. Adjacent slugs of liquid should preferably be mutually soluble.

When treating a permeable underground formation, in which the pore space is partly or substantially filled with oil and water (e.g., connate water, i.e., water adhering to the grains of the formation due to capillary forces) it is of utmost importance for obtaining a sufficiently high compressive strength after treatment of the formation, that the intermediate reaction product can separate from the solution in a pore space which is free from water as well as from oil. It is then preferred to inject, prior to the consolidation fluid, a displacing fluid which is capable of displacing water as well as oil from the formation part to be treated. Such fluid is capable of dissolving or emulsifying water as well as oil, and is preferably soluble in the consolidation fluid.

A volume of such displacing fluid substantially equal to the total volume of the three solutions will usually be found sufficient for the purpose. Preferably, a displacing fluid is used consisting of at least one organic substance having less than 6 carbon atoms and containing at least one keto-oxygen group such as ketone, preferably acetone, and/or a hydroxyl group such as an alcohol, e.g., methanol, ethanol or isopropyl alcohol, for flushing the water and the oil from the formation to be treated.

Preferably, a spacer-fluid is injected after the injection of the fluid suitable for removing the water and the oil originally present in the formation, but before the injection of the mixture of the three solutions. This spacer-fluid is preferably soluble in the mixture. Further, the displacing fluid is preferably soluble in the spacer-fluid since thereby the displacing fluid containing the water and the oil is effectively driven out by the spacer-fluid from the part of the formation to be treated. In general it may be said that each injected fluid should preferably be soluble in the following fluid, so as to ensure that finally only the consolidation solution is present in the part of the formation to be treated.

Coupling Agent

A considerable increase in the compressive strength of the formation treated in the manner described above can be obtained by dissolving a coupling agent in the mixture of the three solutions containing the resin-forming composition.

For the purpose of this specification and claims the term "coupling agent" means an organic substance containing at least one functional group suitable for reacting with the grains or particles of the formation to be treated, and at least one other functional group suitable for reacting with one of the components of the resin-forming composition, or the product formed thereby. Thus, this agent ensures a connecting link between the epoxy resin and the grains of the formation and thereby ensures a greater consolidation integrity.

The coupling agent may be formed by a saturated organo functional silane. "Organo functional silane" is to be understood to be an organic substance containing at least one silicon atom, at least one functional group suitable for reacting with the particles of the formation to be treated, and at least one other functional group suitable for reacting with one of the components of the resin-forming composition, or with the product formed thereby.

An example of an organo functional silane is an "amino functional silane," which is to be understood to be an organic substance containing at least one silicon atom, at least one functional group suitable for reacting with the particles of the formation to be treated, and at least one amino group suitable for reacting with one of the components of the resin-forming composition, or with the product formed thereby.

A further example of an organo functional silane is an "epoxy functional silane" which is to be understood to be an organic substance containing at least one silicon atom, at least one functional group suitable for reacting with the particles of the formation to be treated, and at least one epoxy group suitable for reacting with one of the components of the resin-forming composition, or with the product formed thereby.

If the formation to be treated substantially consists of siliceous material, such as sand, the functional group suitable for reacting with the particles of the formation is preferably formed by a methoxy group or an ethoxy group.

Examples of amino functional silanes are $(C_2H_5O)_3$ Si—$CH_2$—$CH_2$—$CH_2$—NH—$CH_2$—$CH_2$—$NH_2$ (N-aminoethyl-aminopropyltriethoxy-silane) and $(C_2H_5O)_3$ Si—$CH_2$—$CH_2$—$CH_2$—$NH_2$ (aminopropyltriethoxy-silane).

Examples of epoxy functional silanes are:

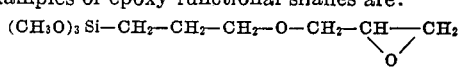

(glycidoxypropyltrimethoxy-silane) and $(CH_3O)_3$ Si—$CH_2$—$CH_2C\underset{\underset{CH_2-CH_2}{|}}{H}\overset{CH_2-CH-O}{\underset{}{\diagdown\diagup}}CH$ (3-4-epoxycyclohexylethyltrimethoxy-silane)

The amount of coupling agent is preferably at most 1 vol. percent of the total volume of the three solutions. Usually the amount will be about ¼ vol. percent of the total volume of the three solutions.

The coupling agent may be premixed with any of the three solutions, provided that no reaction takes place in this solution between the dissolved components.

If desired, the coupling agent may be added to the combination of the three solutions, either before, or during or after mixing thereof.

PREFERRED EMBODIMENT OF THE INVENTION

Example

By way of example, a process of treating an underground formation for consolidation purposes by means of the method according to the present invention will now be described.

In a well penetrating into an oil-producing formation consisting of an unconsolidated sand, the formation conditions such as temperature, porosity and permeability are measured, and samples of the formation sands are taken for the purpose of measuring, inter alia the water and oil saturation.

From the pump capacity and the depth as well as the viscosity of the consolidation fluid and the permeability of the formation, the minimum required length of the clear solution period, which at least equals the time required to pump the consolidation fluid down to and into the formation, can be calculated.

When using a first solution (containing the epoxy compound) and a second solution (containing the curing agent) which have a standard concentration, the only variable which remains to influence the length of the clear solution period at a certain reaction temperature is the amount of the third solution to be mixed with the first and the second solution.

Given a first solution containing 22.8 vol. percent of an epoxy compound indicated by the Trade Mark "EPIKOTE" or 828 "EPON" 828 and 77.2 vol. percent xylene (being an aromatic hydrocarbon acting as a solvent for the epoxy compound), and further given a second solution containing 9.2 vol. percent of bis (3-methyl-4-aminocylohexyl)methane indicated by the Trade Mark "LAROMIN" C 260 (being a curing agent for the epoxy compound) dissolved in 60 vol. percent kerosene indicated by the Trade Mark "SHELL PETROLEUM" and 30.8 vol. percent xyxlene, there will be obtained by adding equal volumes of these two solutions a consolidated fluid suitable for application in the majority of unconsolidated formations, this fluid comprising:

|  | Volume percent |
|---|---|
| "EPIKOTE" 828 (Trade Mark) | 11.4 |
| "LAROMIN" C 260 (Trade Mark) | 4.6 |
| "SHELL PETROLEUM" (Trade Mark) | 30 |
| Xylene | 54 |

The total volume of the first and second solution equals the volume of the formation pore space to be treated. The concentration of resin forming composition is in the present example 16 vol. percent of this solution. A greater concentration (up to 24 vol. percent may be chosen when treating formations having very fine particles (e.g., clay).

The solutions are transported to the oil field separately, either in bulk or in drums.

Before the present method if carried out in the field, laboratory tests have been made to measure at various temperatures the influence of the third solution on the length of the clear solution period.

In this example, the third solution comprises on each 500 milliliters "SHELL PETROLEUM" (Trade Mark):
175 grams phenol
150 milliliters meta- and para-cresol, and
190 milliliters xylene When using this standard third solution, it has been found that mixtures of the three solutions comprising the percentages of the third solution (calculatated on the total volume of the first and second solution) as indicated in the Table below will be suitable to treat formations having the temperatures as indicated in the same Table at a standard clear solution period of 2½ which is greater than the above-mentioned minimum time required in the example to pump down the solution into the formation without any undesirable separation of intermediate reaction product taking place.

TABLE

| Third solution:[1] | Formation temperature, °C. |
|---|---|
| 20.0 | 20 |
| 10.0 | 40 |
| 4.6 | 60 |
| 2.0 | 80 |
| 0.7 | 100 |

[1] Volume percent of the total volume of the first and second solution.

The required percentage of the third solution is now chosen as a function of the temperature of the formation to be treated.

The required volumes of the first and second solution (the total volume of these two solutions equaling the volume of the pore space of the formation part to be treated) and the required volume of the third solution (dictated by the formation temperature) are then mixed together. At the same time, a slug of isopropylalcohol is injected down the well and into the formation to displace the water and the oil present in the pore space of the formation to be treated. The slug of isopropylalcohol is followed by a slug of spacer fluid consisting of 50 percent aromatic hydrocarbons and 50 percent nonaromatic hydrocarbons. Thereafter the consolidation fluid consisting of a mixture of the three solutions is injected down the well and into the formation thereby displacing the isopropylalcohol and the spacer fluid further into the formation. The pumping rate is chosen such that the consolidation fluid is fully within the pore space of the formation before the clear solution period (which is in the present example 2½ hours) has elapsed.

As the consolidation fluid should be kept in the part of the formation to be treated until the reaction between the components thereof is completed, the injection of fluid into the formation pore space should be interrupted as soon as all the consolidation fluid has entered the formation. Care should be taken that this consolidation fluid or part thereof does not remain in the well as otherwise an impermeable resin sheath will be formed on the formation face, which will prevent the passage of fluid out of the formation into the well or vice versa. Further, the consolidation fluid should not be driven too far into the formation, as otherwise those parts of the formation directly surrounding the well will not be consolidated. Therefore a fluid having plastering properties (such as mud slush) may be used as a drive medium, since such fluid will form a substantially impermeable sheath on the wall of the formation directly after the consolidation fluid had been forced into the formation, as a result of which any further displacement of the solution in the formation will be prevented.

As a result of the reaction taking place in the consolidation fluid present in the pore space of the formation part to be treated, an intermediate reaction product is precipitated from the fluid on the surface of the sand grains, which product, on further hardening, forms a hard crosslinked resin in the form of a film or layer which bonds the individual grains together.

In particular when applying coupling agents in the consolidation fluid to be used in the present method for treating underground formations consisting of siliceous sand grains on which carbonates have been deposited, e.g., in the form of a film or layer, it is desirable to pretreat these masses in order to remove these carbonates, when using as coupling agents those having functional groups suitable to react with siliceous surfaces. To this end, the surfaces of the grains are pretreated by means of an acid, whereby the carbonates are removed from the surfaces with which the coupling agent has to react.

It will be understood that the present invention is not limited to the examples given, but that without departing from the invention various types of epoxy compounds, curing agents, coupling agents, solvents, displacing fluids, spacer-fluids, drive fluids and acids can be used.

I claim:

1. Method for treating a permeable formation surrounding a well, said method comprising the following steps:

a. injecting into the formation to be treated, a fluid suitable to displace water and/or oil therefrom thereafter;
b. injecting into the formation a mixture obtained by mixing three solutions, said solutions being:
1. a first solution of an epoxy compound in a solvent substantially consisting of aromatic hydrocarbons;
2. a second solution of a curing agent suitable for curing the epoxy compound, in a solvent comprising aromatic and nonaromatic hydrocarbons; and,
3. a third solution of phenol, meta-cresol and para-cresol in a solvent comprising aromatic and nonaromatic hydrocarbons, wherein the first and second solution are present in the mixture in such quantities that a mixture in such quantities that a mixture of only these two solutions would contain a total amount of epoxy compound and curing agent which is between 12 and 24 vol. percent of the total volume of the mixture of these two solutions; and,
c. retaining the mixture of the three solutions of b in the formation part to be treated until a hard, cross-linked resin has been formed.

2. Method according to claim 1 wherein the displacement fluid *a* comprises an alcohol.

3. Method according to claim 2 wherein the displacement fluid belongs to the group formed by: methanol, ethanol, isopropyl alcohol and mixtures comprising at least one of these liquids.

4. The method of claim 1 wherein the curing agent is a polyamine containing at least three amino-hydrogen atoms.

5. The method of claim 4 wherein the curing agent is bis(3-methyl-4-aminocyclohexyl)methane.

6. The method of claim 1 wherein the solvent of the first solution is formed by xylene.

7. The method of claim 6 wherein the solvent of the second solution comprises a mixture of xylene and kerosene.

8. The method of claim 1 wherein the first solution and the second solution are of such composition that when mixed would form a solution comprising between 9 and 18 vol. percent epoxy compound, between 3 and 6 vol. percent curing agent, between 25 and 35 vol. percent nonaromatic hydrocarbons and between 50 and 60 vol. percent aromatic hydrocarbons.

9. The method of claim 1 wherein one liter of the third solution comprises between 150 and 200 grams phenol, between 125 and 175 milliliters of a mixture consisting of meta- and para-cresol, between 450 and 550 milliliters kerosene and between 170 and 210 milliliters xylene.

10. The method of claim 1 wherein the mixture contains at least one coupling agent.

11. The method of claim 1 wherein a spacer fluid is injected into the formation after the injection of the displacement fluid and prior to the injection of the mixture of the three solutions, the spacer fluid being miscible with the displacement fluid and with the mixture.